(12) United States Patent
Khanna et al.

(10) Patent No.: US 12,117,421 B2
(45) Date of Patent: Oct. 15, 2024

(54) SYSTEM AND METHOD FOR MATERIAL FINGERPRINTING

(71) Applicant: Honda Motor Co., Ltd., Tokyo (JP)

(72) Inventors: Rahul Khanna, Mountain View, CA (US); Tatsuya Ippyo, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 540 days.

(21) Appl. No.: 17/465,280

(22) Filed: Sep. 2, 2021

(65) Prior Publication Data

US 2023/0068857 A1   Mar. 2, 2023

(51) Int. Cl.

| | |
|---|---|
| *G01N 29/44* | (2006.01) |
| *B21D 22/00* | (2006.01) |
| *G01N 29/11* | (2006.01) |
| *G01N 29/265* | (2006.01) |
| *G05B 19/402* | (2006.01) |
| *G06Q 10/087* | (2023.01) |
| *G06Q 30/018* | (2023.01) |
| *G06Q 50/04* | (2012.01) |

(52) U.S. Cl.
CPC ......... *G01N 29/4454* (2013.01); *B21D 22/00* (2013.01); *G01N 29/11* (2013.01); *G01N 29/265* (2013.01); *G05B 19/402* (2013.01); *G06Q 10/087* (2013.01); *G06Q 30/018* (2013.01); *G06Q 50/04* (2013.01); *G01N 2291/015* (2013.01); *G01N 2291/0234* (2013.01); *G05B 2219/37012* (2013.01)

(58) Field of Classification Search
USPC .......................................................... 702/56
See application file for complete search history.

(56) References Cited

U.S. PATENT DOCUMENTS

| | | | |
|---|---|---|---|
| 10,302,751 B2* | 5/2019 | Dewey ................ | G01S 7/52058 |
| 2005/0145745 A1* | 7/2005 | Lewis ..................... | A47K 10/38 |
| | | | 242/563 |
| 2006/0291623 A1* | 12/2006 | Smith .................... | G01V 5/222 |
| | | | 378/69 |

(Continued)

FOREIGN PATENT DOCUMENTS

| | | |
|---|---|---|
| CN | 103424469 | 12/2013 |
| CN | 104297346 | 1/2015 |

(Continued)

*Primary Examiner* — Paul D Lee
(74) *Attorney, Agent, or Firm* — RANKIN, HILL & CLARK LLP

(57) ABSTRACT

Methods and systems for material identification include generating a plurality of first fingerprints for a plurality of material sheets supplied by a supplier at a first step of processing the plurality of material sheets. Each first fingerprint in the plurality of first fingerprints represents a first attenuation measurement of each material sheet in the plurality of material sheets as captured by an array of transducers. Further, the methods and systems include generating a batch mask relating to the first step of processing the plurality of material sheets and based on the plurality of first fingerprints. The batch mask represents a signal correlation of the plurality of first fingerprints that is unique to the plurality of material sheets supplied by the supplier. A target material can be identified using the batch mask.

20 Claims, 8 Drawing Sheets

(56) References Cited

U.S. PATENT DOCUMENTS

| | | | | |
|---|---|---|---|---|
| 2014/0377450 | A1* | 12/2014 | Knorr | B05C 5/00 |
| | | | | 427/9 |
| 2019/0257794 | A1* | 8/2019 | McGovern | G01N 29/043 |
| 2020/0250395 | A1* | 8/2020 | Ross | G06V 10/772 |
| 2022/0100923 | A1* | 3/2022 | Sheng | B21D 22/22 |

FOREIGN PATENT DOCUMENTS

| | | |
|---|---|---|
| CN | 205844271 | 12/2016 |
| CN | 206096039 | 4/2017 |
| CN | 212168356 | 12/2020 |
| EP | 3062114 | 8/2016 |
| JP | 6049349 | 12/2016 |
| KR | 100671418 | 1/2007 |

* cited by examiner

SYSTEM AND METHOD FOR MATERIAL FINGERPRINTING

BACKGROUND

Accurately tracing raw materials to finished products in manufacturing can be difficult. A finished product can be comprised of many different raw materials and components from different suppliers. In complex manufacturing environments where materials are transformed and merged with different materials from different sources, traceability becomes increasingly difficult. In these scenarios, typical tracing methods (e.g., batch numbering) are not sufficient and do not provide accurate information about the finished product post-sale (e.g., in a used state or a damaged state).

In automotive manufacturing, traceability at every step of the manufacturing process is vital for quality control because it allows for analyzing a root cause of defects and/or incidents that may lead to product recalls. Accurate tracing can uncover the origin of problematic raw material, a supplier issue, and/or inform product recalls and product complaints. From raw material, to machined parts, to vehicle assembly, to end-of-life cycle, the ability to track specific details of each vehicle component is desirable.

BRIEF DESCRIPTION

According to one aspect, a computer-implemented method for material identification includes generating a plurality of first fingerprints for a plurality of material sheets supplied by a supplier at a first step of processing the plurality of material sheets. Each first fingerprint in the plurality of first fingerprints represents a first attenuation measurement of each material sheet in the plurality of material sheets as captured by an array of transducers. The method also includes generating a batch mask relating to the first step of processing the plurality of material sheets and based on the plurality of first fingerprints. The batch mask represents a signal correlation of the plurality of first fingerprints that is unique to the plurality of material sheets supplied by the supplier. The method also includes identifying a target material using the batch mask.

According to another aspect, a system for material identification includes an array of transducers and a processor operatively connected for computer communication to the array of transducers. The processor generates a plurality of first fingerprints for a plurality of material sheets supplied by a supplier at a first step of processing the plurality of material sheets. Each first fingerprint in the plurality of first fingerprints represents a first attenuation measurement of each material sheet in the plurality of material sheets as captured by the array of transducers. The processor also generates a batch mask relating the first step of processing the plurality of material sheets and based on the plurality of first fingerprints. The batch mask represents a signal correlation of the plurality of first fingerprints that is unique to the plurality of material sheets supplied by the supplier. The processor also identifies a target material using the batch mask.

According to a further aspect, a non-transitory computer-readable storage medium storing computer-readable instructions includes instructions for capturing attenuation measurements from each material sheet in a plurality of material sheets using an array of transducers. The instructions also include instructions for generating a plurality of first fingerprints for the plurality of material sheets at a first step of processing the plurality of material sheets based on the attenuation measurements captured by the array of transducers. The instructions further include instructions for generating a batch mask relating to the first step of processing the plurality of material sheets and based on the plurality of first fingerprints. The batch mask represents a signal correlation of the plurality of first fingerprints that is unique to the plurality of material sheets supplied by a supplier. The instructions also include instructions for identifying a target material using the batch mask.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

The system and methods described herein are directed to material fingerprinting and material identification for tracking and tracing each component of a product, from suppliers and manufacturers, through assembly, final delivery to customers, and post-sale life. More specifically, the examples herein describe systems and methods in automotive manufacturing that generates identification data about raw materials based on energy transfer measured at different stages of manufacturing, and uses the identification data for accurate tracing of parts (e.g., faulty and/or defective parts). Although automotive manufacturing processes are described herein, it is understood that the systems and methods can be applied to other types of manufacturing processes and systems.

I. System Overview

Figure 1:
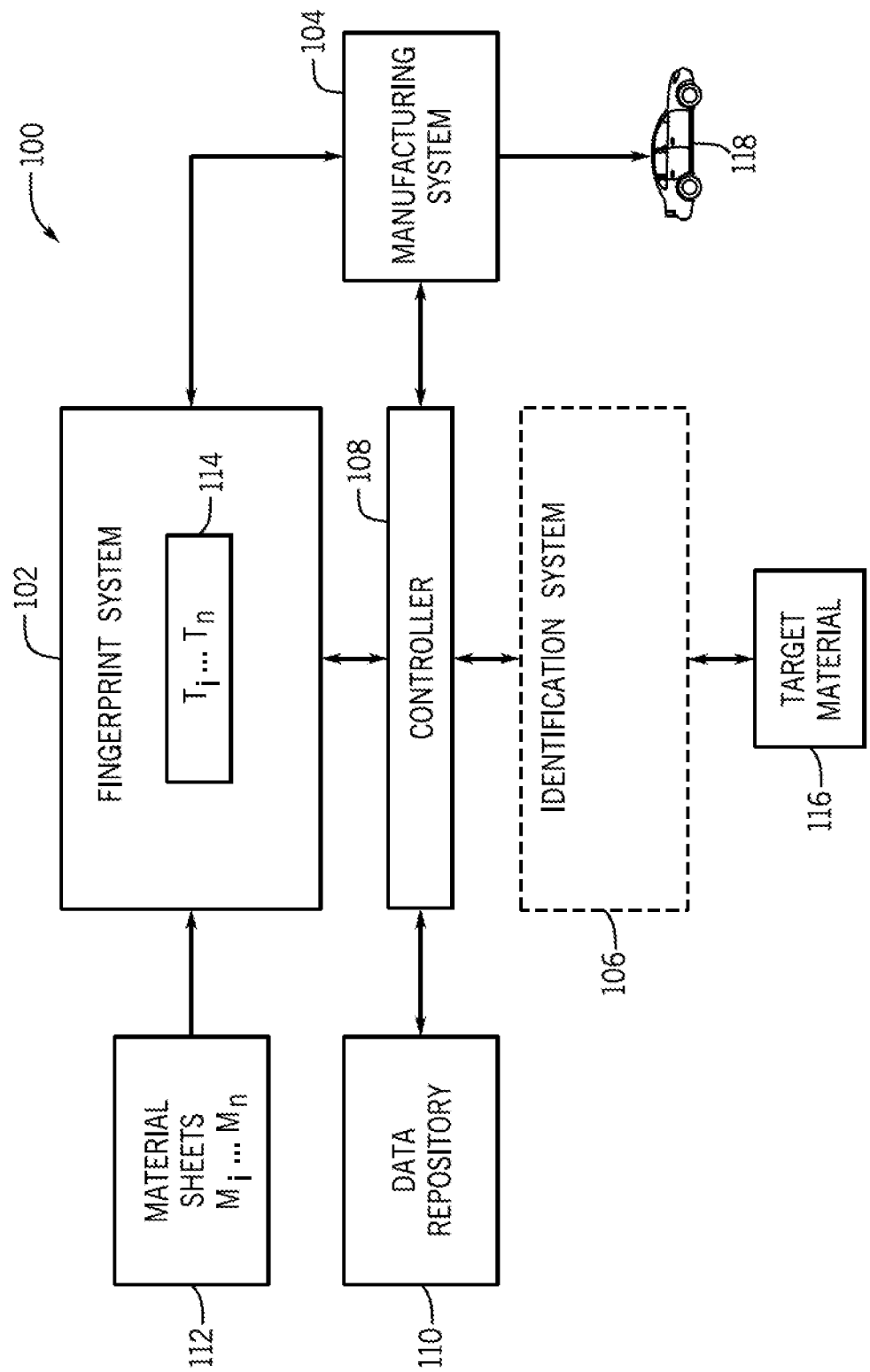
FIG. 1 is a block diagram of a system for material fingerprinting according to one exemplary embodiment.

Referring now to the drawings, wherein the showings are for purposes of illustrating one or more exemplary embodiments and not for purposes of limiting same, FIG. 1 is a block diagram of a system 100 representing a simplified exemplary material fingerprinting and identification system. Generally, the system 100 includes a fingerprint system 102, a manufacturing system 104, an identification system 106, and a data repository 110, each operatively connected for computer communication to a controller 108 (e.g., a processor). The fingerprinting system 102 includes an array of transducers 114 for propagating waves through a medium (e.g., a raw material, a component, a part) at different stages in the manufacturing process. The data received in response to the propagated waves is used to generate "fingerprints" for material identification. As will be described in further detail with FIG. 7, one or more of the components of the system 100 can include, can be, and/or can be executed by a computerized system 700. Further, in some embodiments, the system 100 can be implemented as a distributed network operable for computer communication using wired and/or wireless technologies. It is understood that the components of the system 100, as well as the components of other systems, hardware architectures, and software architectures discussed herein, may be combined, omitted, or organized into different architectures for various embodiments.

As show in FIG. 1, material sheets 112 (e.g., raw material, sheet metal) are processed by the system 100 resulting in a final assembled product, namely, a vehicle 118. Fingerprint generation, which will be described in more detail herein, allows for a separate material, namely a target material 116, to be identified. The material sheets 112 are processed by the fingerprint system 102 to generate fingerprints representative of the material sheets 112 at different steps of the automotive manufacturing process executed by the manufacturing system 104. The fingerprint data can be stored at the data repository 110 for use by the identification system 106 and/or the fingerprint system 102 to identify and/or classify the target material 116. The target material 116 can be, for example, a faulty part, a defective part, and/or a deformed part of the vehicle 118.

In some embodiments, the fingerprinting system 102 is a standalone device for fingerprint generation. For example, a portable device and/or a machine including the array of transducers 114. In other embodiments, the fingerprinting system 102 is integrated within the manufacturing system 104, for example, as a machine and/or component of a manufacturing line. Further, although not shown in FIG. 1, the system 100 can include more than one fingerprinting system 102. For example, a first fingerprinting system could be integrated with the manufacturing system 104 for fingerprint generation. A second fingerprinting system could be integrated with the identification system 106. For example, the identification system 106 could be provided at an auto repair center, where the second fingerprinting system is used to generate fingerprints of the target material 116. In a networked environment, the identification system 106 can access the data repository 110, which stores fingerprint data, for identifying the target material 116.

Fingerprints, as used herein, are unique identifiers that are associated with a batch number from a supplier and/or a manufacturer. More specifically, the fingerprints are representative of an energy transfer and/or a wave characteristic of the material sheets 112, for example, an attenuation measurement. In some embodiments, the fingerprints are data files that include the attenuation measurement, the batch number, supplier information, and other parameter data about the material sheets 112. Other parameter data can include data about the components and products, sub-assembly, and/or assembly created out of the material sheets 112, for example, a vehicle model, a part number, a unit number, among others.

As mentioned above, the array of transducers 114 is used to propagate and measure the energy transfer for generating the fingerprints. It is understood that the array of transducers 114 can include any number of transducers and each transducer can be independently controller and/or moved. In the embodiments discussed herein, the array of transducers 114 utilize ultrasound energy for generating the fingerprints. However, it is understood, that any other type of energy transfer and/or wave measurement can be implemented including mechanical and/or electromagnetic energy.

Figure 2:
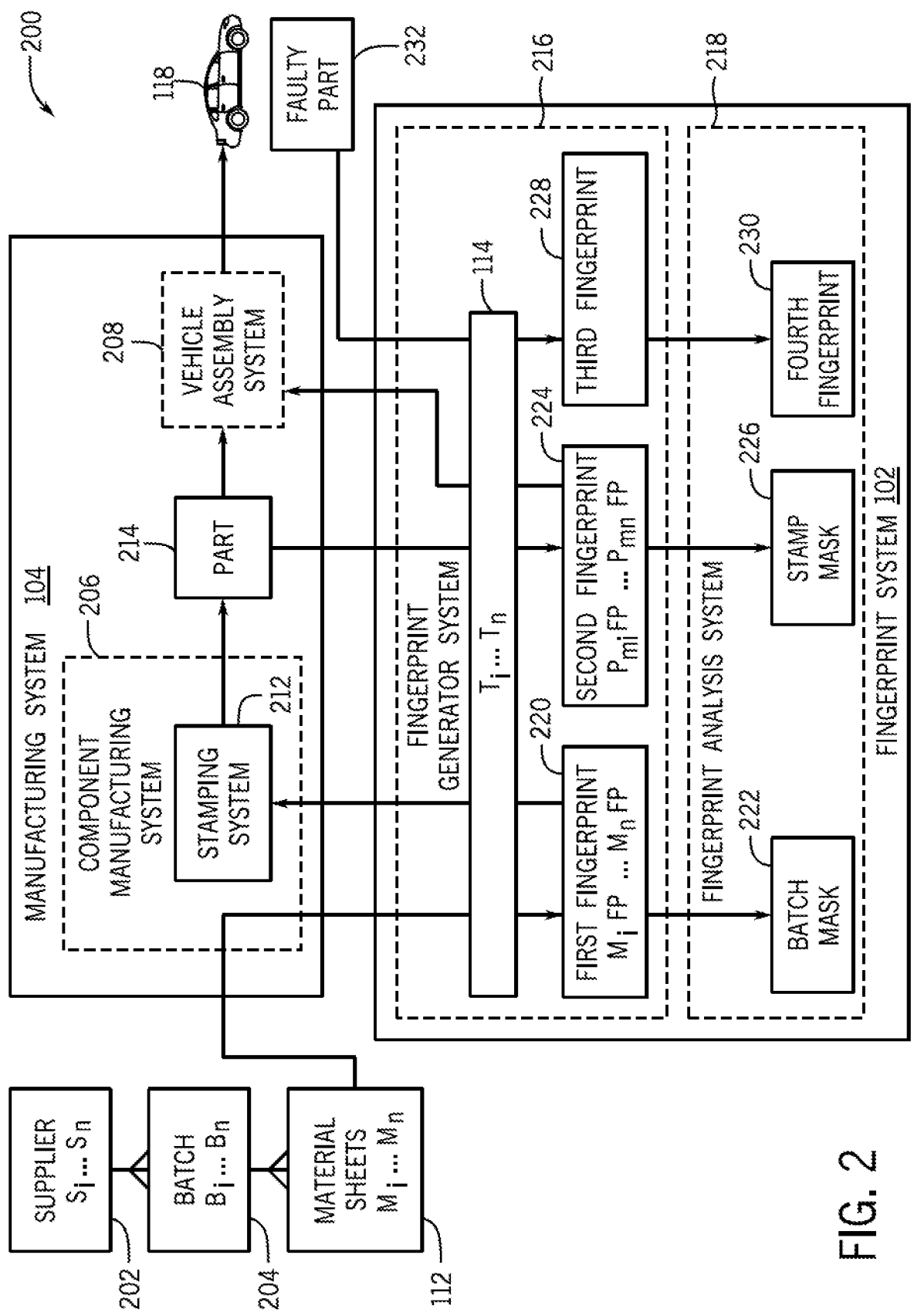
FIG. 2 is a block diagram of a system architecture for material fingerprinting according to one exemplary embodiment.

The system 100 of FIG. 1 will now be described with reference to an exemplary system architecture 200 of FIG. 2. The system architecture 200 illustrates the interactions between the fingerprint system 102 and the manufacturing system 104 according to an exemplary embodiment. For simplicity, like numerals in FIGS. 1 and 2 represent like components. In FIG. 2, the manufacturing system 104 includes a component manufacturing system 206 and a vehicle assembly system 208. The component manufacturing system 206 can facilitate creation of parts (e.g., a part 214) comprising raw material (e.g., the material of sheets 112). The vehicle assembly system 208 can facilitate assembly of all parts and/or sub-assemblies into a final product assembly, namely, the vehicle 118. The fingerprint system 102 includes a fingerprint generator system 216 and a fingerprint analysis system 218. The fingerprint generator system 216 includes the array of transducers 114 for material fingerprinting. The fingerprint analysis system 218 facilitates generation and comparison of target fingerprints to reference fingerprints and signal masks, as well as identification of the target material 116.

As shown in FIG. 2, the material sheets 112 are classified by a supplier 202 and a batch 204. The supplier 202 can provide more than one (one-to-many) batch 204, and the batch 204 can include more than one (one-to-many) material sheets 112. As an illustrative example, a sheet metal coil (not shown) is sourced from a supplier $S_1$ and is associated with a batch $B_1$. At the beginning of the manufacturing process, the sheet metal coil is de-coiled and blanked to a particular size resulting in the material sheets 112. Each of the materials sheets 112 are for manufacturing a particular vehicle component (e.g., a bonnet, a roof, a door panel), which is represented in FIG. 2 the part 214. Accordingly, the material sheets 112 and all parts (e.g., the part 214) manufactured from the material sheets 112 originate from supplier $S_1$ and batch $B_1$.

During complex automotive manufacturing, raw material from different suppliers and batches are formed into different parts for different models of vehicles. In some cases, the raw materials are integrated with other raw materials and/or parts formed from other raw materials from different batches. This makes it difficult to accurately trace the origins of materials identified in the final assembly product. Accordingly, in the methods and systems discussed herein, the raw materials and the resulting parts formed from the raw materials are fingerprinted and used as a reference for identification.

Generally, at a first stage of processing (i.e., prior to stamping), a first fingerprint $M_iFP$ 220 is generated for each material sheet in the material sheets 112. The first fingerprint $M_iFP$ 220 is generated based on an energy transfer measurement propagated and measured by the array of transducers 114. The process for fingerprint generation will be discussed in more detail herein with FIGS. 3 and 4. Based on the first fingerprint $M_iFP$ 220 for each material sheet in the material sheets 112, a batch mask 222 is generated. The batch mask 222 is a signal mask and defines an energy transfer pattern representing each of the material sheets 112. The first fingerprint $M_iFP$ 220 and/or the batch mask 222 for the supplier $S_1$ and the batch $B_1$ can be stored, for example, at the data repository 110.

As shown in FIG. 2, each material sheets of the materials sheets 112 is machined into a particular vehicle component by the component manufacturing system 206. This results in the creation of a vehicle component (e.g., the part 214) for each sheet in the material sheets 112. In the example shown in FIG. 2, the transformation from raw material sheet to vehicle component is executed by a stamping system 212. Here, the material sheets 112 are pressed into the part 214. It is understood that other methods of transformation and/or part creation other than stamping can be implemented herein.

Subsequently, the fingerprint system 102 considers the property changes in the material sheets 112 that result from the stamping system 212. More specifically, at a second stage of processing (i.e., after stamping), a second fingerprint $P_{mi}FP$ 224 for each part 214 is generated based on an energy transfer measurement propagated and measured by the array of transducers 114. Based on the first fingerprint $M_iFP$ 220 for each material sheet in the material sheets 112 and the second fingerprint $P_{mi}FP$ 224 for each part 214, a stamp mask 226 is generated. The stamp mask 226 is a signal mask and defines an energy transfer pattern representing each part 214 machined from each of the material sheets 112.

Using the fingerprint system 102, identification of a target material can be executed. As an illustrative example, the vehicle 118 is involved in an accident. One or more parts of the vehicle 118 can be analyzed to identify a source and/or origin of the material forming the part. As shown in FIG. 2, the fingerprint generator system 216 generates a third fingerprint $PID_{FP}$ 228 for a faulty part 232 (e.g., the target material). As will be discussed in more detail herein, the stamp mask 226 is applied to the third fingerprint $PID_{FP}$ 228 to generate a fourth fingerprint 230. The fourth fingerprint is then compared to the reference fingerprints to identify and/or classify the faulty part 232 (e.g., identify the supplier 202 and/or the batch 204). The details of fingerprint generation and material identification will now be discussed in more detail.

II. Fingerprint Generation

Figure 3:
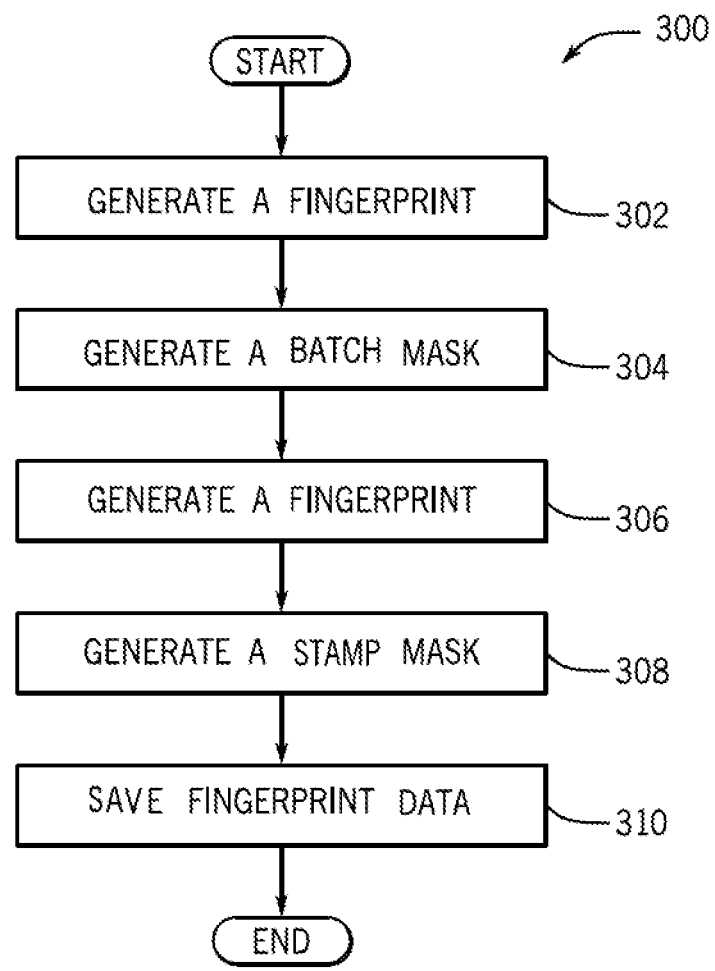
FIG. 3 is a flow chart of a method for material fingerprinting according to one exemplary embodiment.

Fingerprint generation will now be described in more detail with FIG. 3 and with further reference to the components of FIGS. 1 and 2. FIG. 3 is a flow chart of an exemplary method 300 for fingerprint generation. At block 302, the method 300 includes generating a fingerprint. More specifically, block 302 includes generating a plurality of first fingerprints for each sheet in the plurality of material sheets 112 supplied by a supplier 202 at a first step of processing (e.g., prior to stamping) the plurality of material sheets 112. Each first fingerprint in the plurality of first fingerprints represents a first attenuation measurement of each material sheet in the plurality of material sheets 112 as captured by the array of transducers 114.

Figure 4:
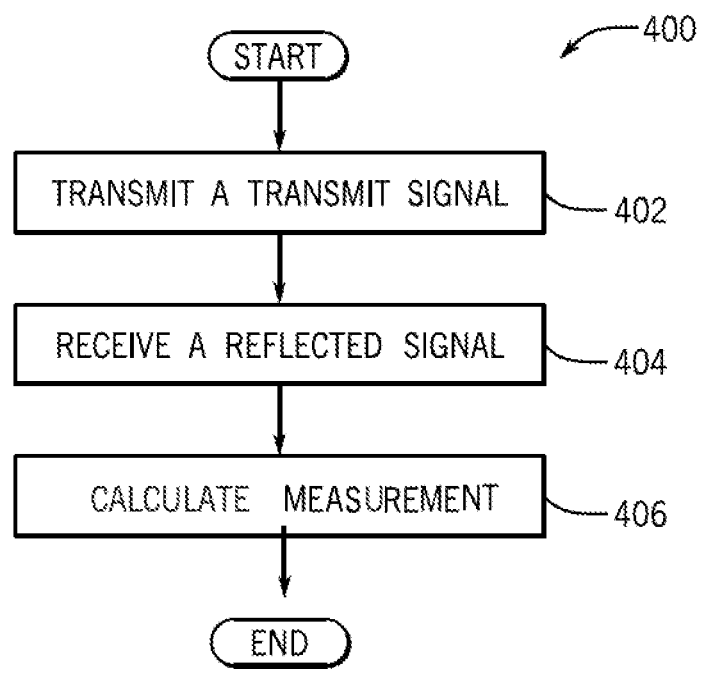
FIG. 4 is a flow chart of a method for material fingerprinting according to another exemplary embodiment.

The operation of the array of transducers 114 for capturing an energy transfer measurement will now be discussed with reference to FIG. 4. At block 402, the method 400 of FIG. 4 includes transmitting a transmit signal. Each transducer in the array of transducers 114 transmits a transmit signal (e.g., energy) towards a target medium. In the embodiments discussed herein, the target medium could be a raw material at a first step of processing (e.g., the material sheets 112 prior to stamping), a part comprising the raw material at a second step of processing (e.g., the part 214 after stamping), or the target material 116 (e.g., the faulty part 232). In this particular example associated with block 302 of FIG. 3, the target medium is each sheet of the material sheets 112 at the first step of processing.

In the examples described herein, the energy transmitted by each transducer in the array of transducers 114 is ultrasound energy. However, the energy transmitted can include, but is not limited to, light, sonic, magnetic waves, electromagnetic waves, among others. It is understood that the energy can be transmitted on a pulsed basis or a continuous basis.

Upon transmission of the energy toward the target medium, energy is reflected back and received by the array of transducers 114. Accordingly, at block 402, the method 400 includes receiving a reflected signal. At block 406, a measurement is calculated based on the reflected signal. In one embodiment, the measurement is an attenuation measurement. However, as mentioned herein, it is understood that other energy measurements and/or signal characteristics can be implemented with the methods and systems discussed herein.

As mentioned above, the array of transducers 114 can include any number of transducers $T_i$ and each of the transducers can be independently controlled. In one embodiment, generating the fingerprint at block 302 of the method 300 includes controlling a position of the array of transducers 114 according to a plurality of predetermined positions relative to a surface of each of the material sheets 112. For example, the controller 108 can control movement of each of the transducers $T_i$ into predetermined positions relative to the material sheets 112. In this embodiment, at block 402 of the method 400, the array of transducers 114 transmit a transmit signal at the plurality of predetermined positions. Accordingly, at block 404, the array of transducers 114 receive a reflected signal in response to the transmit signal.

Figure 5A:
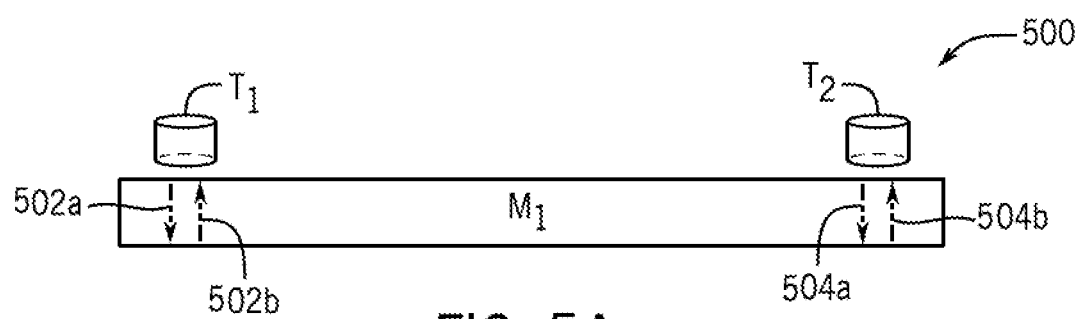
FIG. 5A is a side view of a material sheet and two transducers according to one exemplary embodiment.

Specific operation and positioning of the array of transducers 114 will now be discussed in more detail. Referring now to FIG. 5A, a side view 500 is shown of a material sheet $M_1$ with two transducers, a first transducer $T_1$ and a second transducer $T_2$. In this embodiment, the transducers $T_i$ are positioned adjacent to side edges of the material sheet $M_1$. The first transducer $T_1$ transmits a transmit signal 502a and in response received a reflected signal 502b. The second transducer $T_1$ transmits a transmit signal 504a and in response received a reflected signal 504b.

Figure 5B:
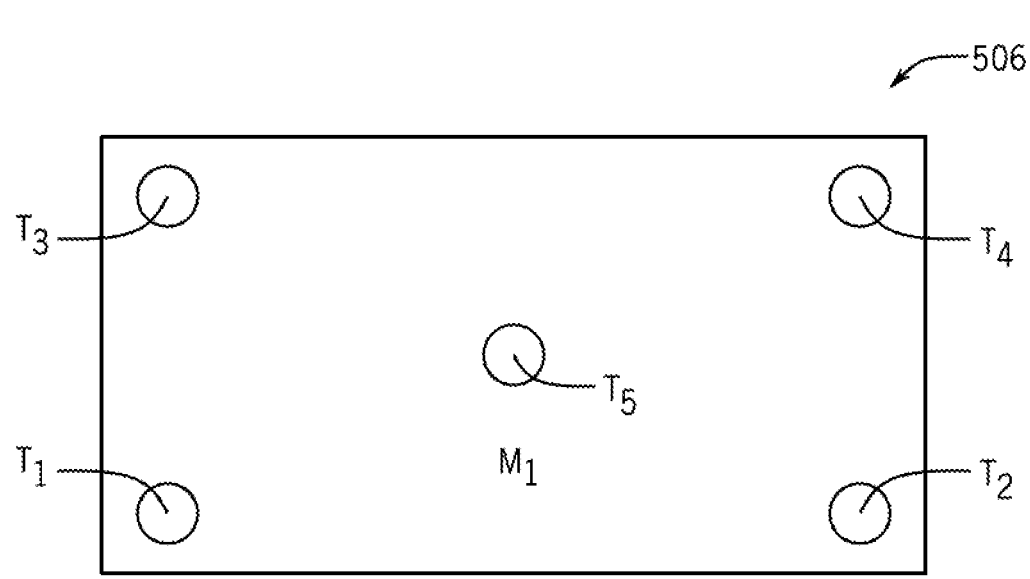
FIG. 5B is a top view of the material sheet with five transducers.

In FIG. 5B, a top view 506 of the material sheet $M_1$ is shown in which five transducers are shown, the first transducer $T_1$, the second transducer $T_2$, a third transducer $T_3$, a fourth transducer $T_4$, and a fifth transducer $T_5$. In this embodiment, the first transducer $T_1$, the second transducer $T_2$, the third transducer $T_3$, and the fourth transducer $T_4$ are each positioned at a corner of the material sheet $M_1$. The fifth transducer $T_5$ is positioned at a center of the material sheet $M_1$. Although not shown in FIG. 5B, each of the transducers $T_i$ can transmit a transmit signal and receive a reflected signal.

Figure 5C:
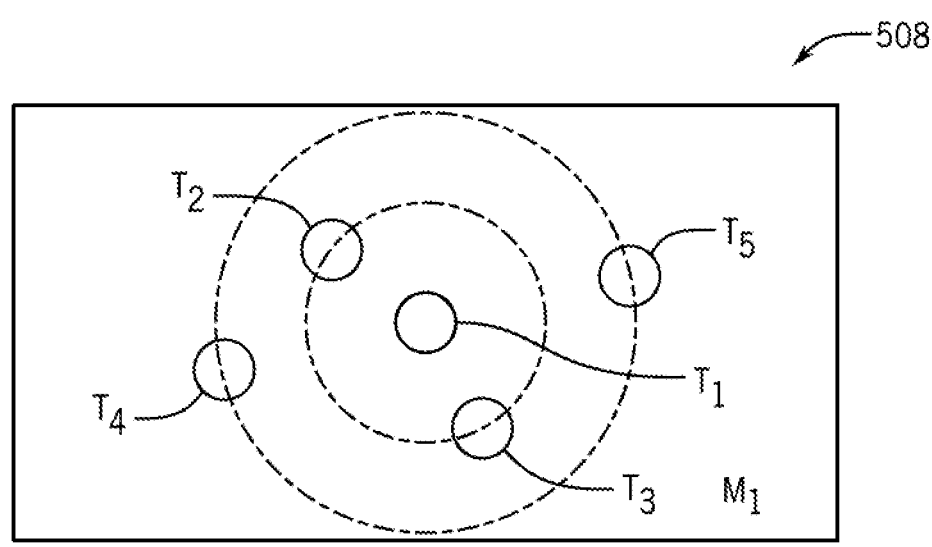
FIG. 5C is a top view of the material sheet with five transducers in a different position than that shown in FIG. 5B.

FIG. 5C shows a top view 508 in an alternate configuration. Here, the transducers Ti are positioned to form a concentric circles centered with respect to the material sheet $M_1$. Although not shown in FIG. 5C, each of the transducers $T_i$ can transmit a transmit signal and receive a reflected signal. It is understood that each transducers $T_i$ of the array of transducers 114 can be configured into different positions than those shown herein with respect to the material sheet $M_1$. In some embodiments, the positioning is dependent on the type of raw material and/or the vehicle component to be formed from the raw material. In other embodiments, the positioning is based on the type of energy measurement and/or signal characteristic to be measured.

Referring again to FIG. 3, the method 300 includes at block 304 generating a batch mask. As shown in FIG. 2, the batch mask 222 relates to the first step of processing (i.e., prior to stamping) and is based on the plurality of first fingerprints $M_iFP$ 220. In one embodiment, the batch mask 222 represents a signal correlation of the plurality of first fingerprints $M_iFP$ 220 that is unique to the plurality of material sheets 112 supplied by the supplier 202.

At block 306, the method 300 includes generating a fingerprint. More specifically, the fingerprint system 102 generates a plurality of second fingerprints $P_{mi}FP$ 224 for the plurality of material sheets 112 at a second step of processing the plurality of material sheets 112. As shown in FIG. 2, the second step of processing includes stamping each of the material sheets 112 into an automotive component (e.g., the part 214). The second fingerprint $P_{mi}FP$ 224 of each of the material sheets 112 represents an attenuation measurement of the automotive component.

Accordingly, each second fingerprint in the plurality of second fingerprints $P_{mi}FP$ 224 represents a second attenuation measurement of each material sheet in the plurality of material sheets 112 as captured by the array of transducers 114.

Figure 5D:
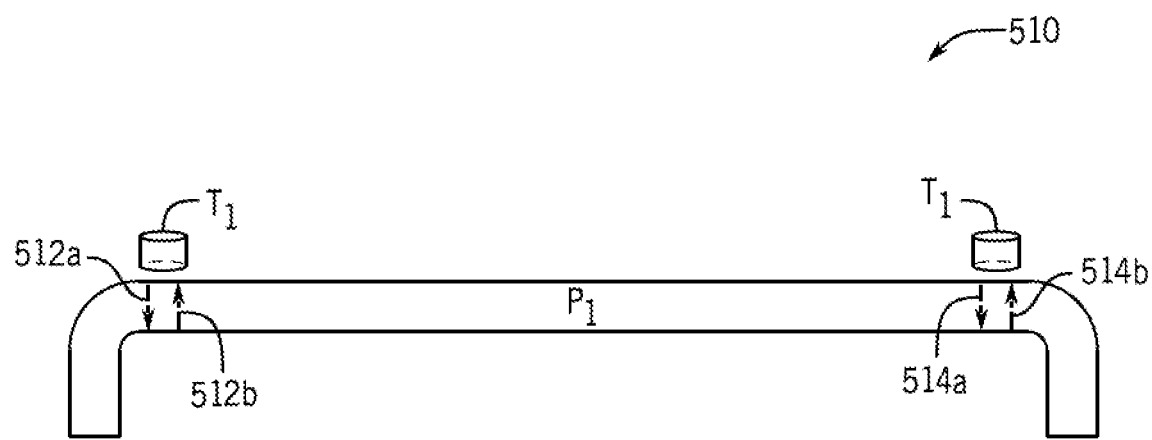
FIG. 5D is a side view of a part and two transducers according to an exemplary embodiment.

Generation of the second fingerprint $P_{mi}FP$ 224 includes the same steps as discussed above with FIG. 4, except the vehicle component formed from the raw material is fingerprinted. For example, FIG. 5D illustrates a side view 510 of a part Pi. The part Pi has been formed into an automotive component (e.g., a bonnet) from the material sheet $M_1$. In this example, a first transducer $T_1$ and a second transducer $T_2$ are positioned adjacent to side edges of the part Pi. The first transducer $T_1$ transmits a transmit signal 512a and in response received a reflected signal 512b. The second transducer $T_2$ transmits a transmit signal 514a and in response received a reflected signal 514b. Although not shown, it is understood that any number of transducers $T_i$ in any position and/or configuration with respect to the part Pi can be implemented herein. In some embodiments, the same number of transducers and the same positioning of each transducer is the same for generating the first fingerprint $M_iFP$ 220 and the second fingerprint $P_{mi}FP$ 224.

Referring again to FIG. 3, at block 308, the method 300 includes generating a stamp mask. In one embodiment, the stamp mask 226 represents a signal correlation of the plurality of second fingerprints $P_{mi}FP$ 224 that is unique to the plurality of material sheets 112 and/or the each part 214 after the second step of processing (i.e., after stamping). As shown in FIG. 2, the stamp mask 226 is based on comparing the plurality of first fingerprints $M_iFP$ 220 and the plurality of second fingerprints $P_{mi}FP$ 224. In one embodiment, the common points are identified in the plurality of first fingerprints $M_iFP$ 220 and the plurality of second fingerprints $P_{mi}FP$ 224. The common points are then removed to generate the stamp mask 226. In this embodiment, a pattern of deviation between the batch mask 222 and the stamp mask 226 is determined. The pattern of deviation and a related confidence score allows for variation tracking during identification.

Referring again to FIG. 3, at block 310, the method 300 includes saving the fingerprint data. For example, the plurality of first fingerprints $M_iFP$ 220, the batch mask 222, and the stamp mask 226 can be stored at an identification datastore, for example, the data repository 110. The identification datastore can include identification data for each supplier 202 and each batch 204. It is understood that in some embodiments, the fingerprint data and/or the data repository 110 can be represented as a machine learning model including a neural network.

III. Material Identification

Figure 6:
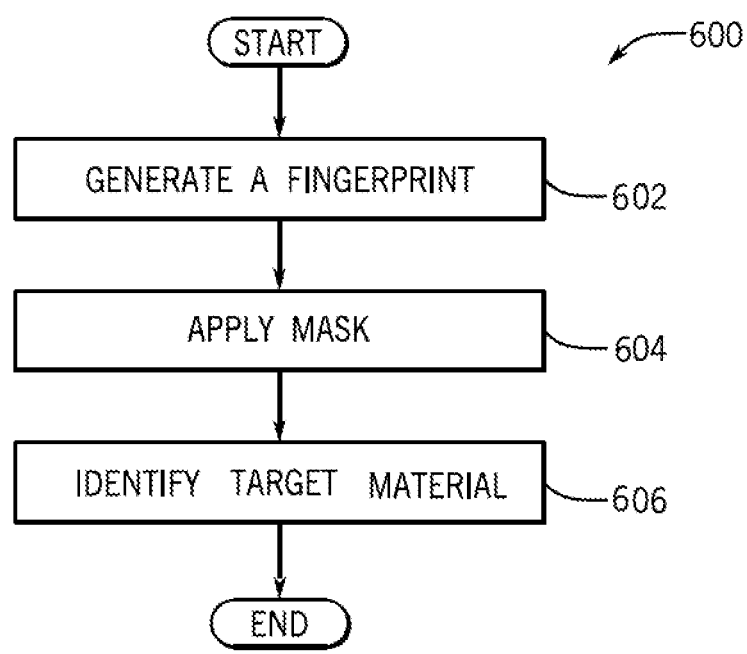
FIG. 6 is a flow chart of a method for identifying a target material according to an exemplary embodiment.

Referring again to the illustrative example, discussed above, the vehicle 118 is involved in an accident and/or the vehicle 118 malfunctions. One or more faulty parts 232 of the vehicle 118 can be analyzed to identify a source and/or origin of the target material 116 forming the faulty part 232. Referring now to FIG. 6, a method 600 for material identification will be described. At block 602, the method 600 includes generating a fingerprint. More specifically, a third fingerprint 228 of the target material 116 (e.g., the faulty part 232) is generated based on a target material attenuation measurement captured by the array of transducers 114.

Figure 5E:
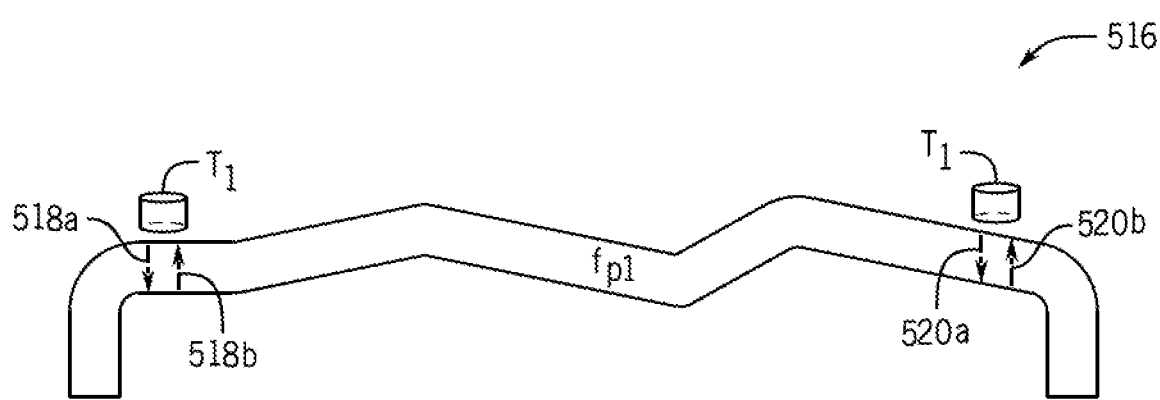
FIG. 5E is a side of a faulty part and two transducers according to an exemplary embodiment.

Generation of the third fingerprint 228 includes the same steps as discussed above with FIG. 4, except the target material 116 and/or the faulty part 232 is fingerprinted. For example, FIG. 5E illustrates a side view of a faulty part $f_{p1}$, namely a vehicle bonnet that has been compromised in an accident. In this example, a first transducer $T_1$ and a second transducer $T_2$ are positioned adjacent to side edges of the faulty part $f_{p1}$. The first transducer $T_1$ transmits a transmit signal 518a and in response received a reflected signal 518b. The second transducer $T_2$ transmits a transmit signal 520a and in response received a reflected signal 520b. Although not shown, it is understood that any number of transducers $T_i$ in any position and/or configuration with respect to the faulty part $f_{p1}$ can be implemented herein.

Referring again to FIG. 6, at block 604, the method 600 includes applying a mask to the third fingerprint 228. In one embodiment the stamp mask 226 is applied to the third fingerprint 228 to generate a fourth fingerprint 230. The stamp mask 226 and/or other fingerprint data can be retrieved from the data repository 110. At block 606, the method 600 includes identifying a target material. In one embodiment, identifying the target material 116 is based on the fourth fingerprint 230 and the batch mask 226. In particular, the fourth fingerprint 230 can be compared to the reference fingerprints. For example, the first fingerprint 220 and/or the batch mask 222. The pattern of deviation and confidence scores can be applied to identify a match, from which the supplier 202 and/or the batch 204 from which the target material 116 originated from can be determined.

IV. System Configuration and Definitions

Figure 7:
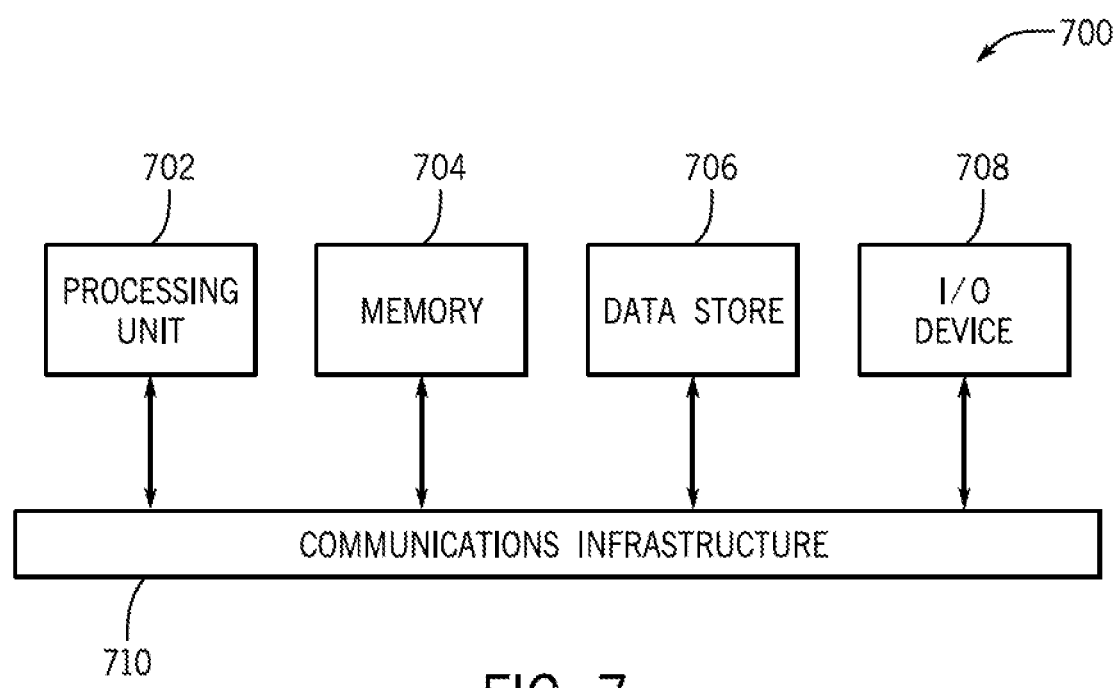
FIG. 7 is a block diagram of an exemplary computing system according to one embodiment.

As mentioned above, one or more of the components of FIG. 1 and/or FIG. 2 can include, can be, and/or can be executed by the computerized system 700 schematically shown in FIG. 7. Accordingly, the computerized system 700 can be used to implement and/or execute the methods, functions, and components described herein. In FIG. 7, the computerized system 700 includes a processing unit 702, a memory 704, a data store 706, and an I/O device 708 each operatively connected for computer communication to a communications infrastructure 710.

The processing unit 702 can include logic circuitry with hardware, firmware, and software architecture frameworks for facilitating material fingerprinting and identification as described herein. In some embodiments, the processing unit 702 can store application frameworks, kernels, libraries, drivers, application program interfaces, among others, to execute and control hardware and functions discussed herein. In some embodiments, the memory 704 and/or the data store 706 can store similar components as the processing unit 702 for execution by the processing unit 702.

The I/O device 708 can include one or more input-output devices for providing visual, audio, and/or tactile input and/or output from and/or to another entity (e.g., an operator on a manufacturing line). The I/O device 708 can be a monitor, display, keyboards, touch screens, speakers, among other devices. The communications infrastructure 710 can include software and hardware to facilitate communication between the components of the computerized system 700 and/or other components of the system 100. Specifically, the communications infrastructure 710 can include network interface controllers, other hardware and software that manages and/or monitors connections, and/or controls bi-directional data transfer using, for example, a communication network (not shown).

The following includes definitions of selected terms employed herein. The definitions include various examples and/or forms of components that fall within the scope of a term and that may be used for implementation. The examples are not intended to be limiting. Further, the components discussed herein, may be combined, omitted or organized with other components or into different architectures.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more computing devices (e.g., computer, personal digital assistant, cellular telephone, network device, vehicle, vehicle computing device, infrastructure device, roadside device) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless area network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions, algorithms, and/or data configured to perform one or more of the disclosed functions when executed. Computer-readable medium can be non-volatile, volatile, removable, and non-removable, media implemented in any method or technology for storage of information such as computer readable instructions, data structures, modules or other data. Computer-readable medium can include, but is not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can interface with. Computer-readable medium excludes non-transitory tangible media and propagated data signals.

"Database," as used herein, is used to refer to a table. In other examples, "database" may be used to refer to a set of tables. In still other examples, "database" may refer to a set of data stores and methods for accessing and/or manipulating those data stores. A database may be stored, for example, at a disk and/or a memory.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Operable connection," or a connection by which entities are "operably connected," is one in which signals, physical communications, and/or logical communications may be sent and/or received. An operable connection may include a wireless interface, a physical interface, a data interface, and/or an electrical interface.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

"Vehicle," as used herein, refers to any moving vehicle capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. The autonomous vehicle may have any level or mode of driving automation ranging from, for example, fully manual to fully autonomous. Further, the term "vehicle" may include vehicles that are automated or non-automated with pre-determined paths or free-moving vehicles.

It will be appreciated that various embodiments of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for material identification, comprising:
   generating a plurality of first fingerprints for a plurality of material sheets supplied by a supplier at a first step of processing the plurality of material sheets, wherein each first fingerprint in the plurality of first fingerprints represents a first attenuation measurement of each material sheet in the plurality of material sheets and captured by an array of transducers;
   generating a batch mask relating to the first step of processing the plurality of material sheets and based on the plurality of first fingerprints, wherein the batch mask represents a signal correlation of the plurality of first fingerprints that is unique to the plurality of material sheets supplied by the supplier;
   identifying a target material using the batch mask; and
   generating a plurality of second fingerprints for the plurality of material sheets at a second step of processing the plurality of material sheets, wherein each second fingerprint in the plurality of second fingerprints represents a second attenuation measurement of each material sheet in the plurality of material sheets and captured by the array of transducers, wherein the second step of processing includes stamping each material sheet into an automotive component, and the second fingerprint of each material sheet represents an attenuation measurement of the automotive component.

2. The computer-implemented method of claim 1, wherein generating the plurality of first fingerprints includes controlling movement of the array of transducers to a plurality of predetermined positions relative to a surface of each material sheet.

3. The computer-implemented method of claim 2, further including controlling the array of transducers to transmit a transmit signal at each material sheet in the plurality of predetermined positions, receiving a reflected signal for each material sheet in response to the transmit signal, and generating the plurality of first fingerprints based on the reflected signal for each material sheet.

4. The computer-implemented method of claim 1 further including generating a stamp mask based on comparing the plurality of first fingerprints and the plurality of second fingerprints, wherein the stamp mask represents a signal correlation of the plurality of second fingerprints that is unique to the plurality of material sheets after the second step of processing.

5. The computer-implemented method of claim 4, wherein identifying the target material includes generating a third fingerprint of the target material based on a target material attenuation measurement captured by the array of transducers and generating a fourth fingerprint of the target material by applying the stamp mask to the third fingerprint.

6. The computer-implemented method of claim 5, wherein identifying the target material is based on the fourth fingerprint and the batch mask.

7. The computer-implemented method of claim 5, including storing the plurality of first fingerprints, the batch mask, and the stamp mask at an identification datastore, wherein the identification datastore includes identification data for each batch of materials and supplier.

8. The computer-implemented method of claim 7, wherein the identification datastore is a data repository that is a machine learning model including a neural network.

9. The computer-implemented method of claim 4, wherein a pattern of deviation between the batch mask and the stamp mask is determined.

10. The computer-implemented method of claim 1, wherein identifying the target material using the batch mask includes identifying a batch and a supplier of the target material.

11. A system for material identification, comprising:
    an array of transducers; and
    a processor operatively connected for computer communication to the array of transducers, wherein the processor:
       generates a plurality of first fingerprints for a plurality of material sheets supplied by a supplier at a first step of processing the plurality of material sheets, wherein each first fingerprint in the plurality of first fingerprints represents a first attenuation measurement of each material sheet in the plurality of material sheets and captured by the array of transducers;
       generates a batch mask relating the first step of processing the plurality of material sheets and based on the plurality of first fingerprints, wherein the batch mask represents a signal correlation of the plurality of first fingerprints that is unique to the plurality of material sheets supplied by the supplier ;
       identifies a target material using the batch mask; and
       generates a plurality of second fingerprints for the plurality of material sheets at a second step of processing the plurality of material sheets, wherein each second fingerprint in the plurality of second fingerprints represents a second attenuation measurement of each material sheet in the plurality of material sheets, wherein the second step of processing includes stamping each material sheet into an automotive component, and the second fingerprint of each material sheet represents an attenuation measurement of the automotive component.

12. The system of claim 11, wherein the processor controls a position of the array of transducers according to a plurality of predetermined positions relative to a surface of each material sheet, wherein the processor transmits a transmit signal at the plurality of predetermined positions using the array of transducers, and the processor receives a reflected signal in response to the transmit signal, wherein the processor generates the plurality of first fingerprints based on the reflected signal for each material sheet.

13. The system of claim 11, wherein the processor further generates a stamp mask based on the plurality of first fingerprints and the plurality of second fingerprints.

14. The system of claim 13, wherein the processor identifies the target material based on a target material attenuation measurement captured by the array of transducers and the batch mask.

15. The system of claim 13, wherein a pattern of deviation between the batch mask and the stamp mask is determined.

16. A non-transitory computer-readable storage medium storing computer-readable instructions, comprising:
- instructions for capturing attenuation measurements from each material sheet in a plurality of material sheets using an array of transducers;
- instructions for generating a plurality of first fingerprints for the plurality of material sheets at a first step of processing the plurality of material sheets based on the attenuation measurements captured by the array of transducers;
- instructions for generating a batch mask relating to the first step of processing the plurality of material sheets and based on the plurality of first fingerprints, wherein the batch mask represents a signal correlation of the plurality of first fingerprints that is unique to the plurality of material sheets supplied by a supplier;
- instructions for identifying a target material using the batch mask; and
- instructions for generating a plurality of second fingerprints for the plurality of material sheets at a second step of processing the plurality of material sheets based on second attenuation measurements captured by the array of transducers, wherein each second fingerprint in the plurality of second fingerprints represents a second attenuation measurement of each material sheet in the plurality of material sheets, wherein the second step of processing includes stamping each material sheet into an automotive component, and the second fingerprint of each material sheet represents an attenuation measurement of the automotive component.

17. The non-transitory computer-readable storage medium of claim 16, wherein the instructions for capturing attenuation measurements includes controlling movement of the array of transducers according to a predetermined position relative to each material sheet and transmitting a transmit signal at each material sheet in the predetermined position.

18. The non-transitory computer-readable storage medium of claim 16, further including instructions for generating a stamp mask based on comparing the plurality of first fingerprints and the plurality of second fingerprints, wherein the stamp mask represents a signal correlation of the plurality of second fingerprints that is unique to the plurality of material sheets after the second step of processing.

19. The non-transitory computer-readable storage medium of claim 18, wherein a pattern of deviation between the batch mask and the stamp mask is determined.

20. The non-transitory computer-readable storage medium of claim 16, wherein the instructions for identifying the target material using the batch mask includes identifying a batch and a supplier of the target material.

* * * * *